US012771506B2

(12) United States Patent
Taherzadeh Boroujeni et al.

(10) Patent No.: US 12,771,506 B2
(45) Date of Patent: Oct. 20, 2026

(54) TECHNIQUES FOR TRANSMITTING PHASE TRACKING REFERENCE SIGNALS IN RESOURCES ASSOCIATED WITH UPLINK CHANNEL REPETITIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 17/649,618

(22) Filed: Feb. 1, 2022

(65) Prior Publication Data

US 2022/0329382 A1 Oct. 13, 2022

Related U.S. Application Data

(60) Provisional application No. 63/173,649, filed on Apr. 12, 2021.

(51) Int. Cl.
*H04L 5/00* (2006.01)

(52) U.S. Cl.
CPC .......... *H04L 5/0051* (2013.01); *H04L 5/0005* (2013.01)

(58) Field of Classification Search
CPC ... H04L 5/0051; H04L 5/0005; H04L 1/0006; H04L 1/08; H04L 1/0003; H04L 1/0009; H04L 27/2602; H04L 5/0048
USPC .......................................................... 455/452.1
See application file for complete search history.

(56) References Cited

U.S. PATENT DOCUMENTS

2020/0137745 A1* 4/2020 Bachu .................... H04L 69/321
2020/0280386 A1* 9/2020 Xu ..................... H04W 72/1263
2022/0095350 A1* 3/2022 Lee ......................... H04L 1/0003
2023/0076139 A1* 3/2023 Muruganathan ...... H04L 5/0048
2023/0299905 A1* 9/2023 Yuan ...................... H04L 5/0073
370/329

* cited by examiner

*Primary Examiner* — Tanmay K Shah
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may determine one or more of a resource allocation associated with uplink channel repetitions or a channel usage indicating whether a downlink reception or another uplink transmission is present in resources in time between the uplink channel repetitions. The UE may transmit, to a network node, phase tracking reference signals (PTRSs) using resources associated with the uplink channel repetitions based at least in part on the determination of the one or more of the resource allocation or the channel usage. Numerous other aspects are described.

30 Claims, 9 Drawing Sheets

500

TECHNIQUES FOR TRANSMITTING PHASE TRACKING REFERENCE SIGNALS IN RESOURCES ASSOCIATED WITH UPLINK CHANNEL REPETITIONS

CROSS-REFERENCE TO RELATED APPLICATION

This Patent Application claims priority to U.S. Provisional Patent Application No. 63/173,649, filed on Apr. 12, 2021, entitled "TECHNIQUES FOR TRANSMITTING PHASE TRACKING REFERENCE SIGNALS IN RESOURCES ASSOCIATED WITH UPLINK CHANNEL REPETITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmitting phase tracking reference signals (PTRSs) in resources associated with uplink channel repetitions.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining one or more of a resource allocation associated with uplink channel repetitions or a channel usage indicating whether a downlink reception or another uplink transmission is present in resources in time between the uplink channel repetitions; and transmitting, to a base station, phase tracking reference signals (PTRSs) using resources associated with the uplink channel repetitions based at least in part on the determination of the one or more of the resource allocation or the channel usage.

In some aspects, the method includes receiving, from the base station, demodulation reference signal (DMRS) bundles across one or more slots based at least in part on the PTRSs.

In some aspects, the PTRSs are associated with a time density and a frequency density.

In some aspects, the uplink channel repetitions are physical uplink shared channel (PUSCH) repetitions.

In some aspects, the uplink channel repetitions are physical uplink control channel (PUCCH) repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is a sounding reference signal (SRS) transmission.

In some aspects, the method includes receiving, from the base station, a set of thresholds for modulation and coding schemes (MCSs) corresponding to the resource allocation.

In some aspects, the method includes receiving, from the base station, a set of thresholds for MCSs corresponding to the channel usage.

In some aspects, the method includes receiving, from the base station, a set of thresholds for respective bandwidths corresponding to the resource allocation.

In some aspects, the method includes receiving, from the base station, a set of thresholds for respective bandwidths corresponding to the channel usage.

In some aspects, a method of wireless communication performed by a base station includes receiving, from a UE, PTRSs using resources associated with the uplink channel repetitions based at least in part on one or more of a resource allocation associated with the uplink channel repetitions or a channel usage indicating whether a downlink reception or another uplink transmission is present in resources in time between the uplink channel repetitions; and transmitting, to the UE, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the method includes transmitting, to the UE, a set of thresholds for MCSs corresponding to the resource allocation.

In some aspects, the method includes transmitting, to the UE, a set of thresholds for MCSs corresponding to the channel usage.

In some aspects, the method includes transmitting, to the UE, a set of thresholds for respective bandwidths corresponding to the resource allocation.

In some aspects, the method includes transmitting, to the UE, a set of thresholds for respective bandwidths corresponding the channel usage.

In some aspects, a UE for wireless communication includes a memory and one or more processors, coupled to the memory, configured to: determine one or more of a resource allocation associated with uplink channel repetitions or a channel usage indicating whether a downlink reception or another uplink transmission is present in resources in time between the uplink channel repetitions; and transmit, to a base station, PTRSs using resources associated with the uplink channel repetitions based at least in part on the determination of the one or more of the resource allocation or the channel usage.

In some aspects, the one or more processors are further configured to receive, from the base station, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the one or more processors are further configured to receive, from the base station, a set of thresholds for MCSs corresponding to the resource allocation.

In some aspects, the one or more processors are further configured to receive, from the base station, a set of thresholds for MCSs corresponding to the channel usage.

In some aspects, the one or more processors are further configured to receive, from the base station, a set of thresholds for respective bandwidths corresponding to the resource allocation.

In some aspects, the one or more processors are further configured to receive, from the base station, a set of thresholds for respective bandwidths corresponding to the channel usage.

In some aspects, a base station for wireless communication includes a memory and one or more processors, coupled to the memory, configured to: receive, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions; and transmit, to the UE, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the one or more processors are further configured to transmit, to the UE, a set of thresholds for MCSs corresponding to the resource allocation.

In some aspects, the one or more processors are further configured to transmit, to the UE, a set of thresholds for MCSs corresponding to the channel usage.

In some aspects, the one or more processors are further configured to transmit, to the UE, a set of thresholds for respective bandwidths corresponding to the resource allocation.

In some aspects, the one or more processors are further configured to transmit, to the UE, a set of thresholds for respective bandwidths corresponding to the channel usage.

In some aspects, a non-transitory computer-readable medium storing a set of instructions for wireless communication includes one or more instructions that, when executed by one or more processors of a UE, cause the UE to: determine one or more of a resource allocation associated with uplink channel repetitions or a channel usage indicating whether a downlink reception or another uplink transmission is present in resources in time between the uplink channel repetitions; and transmit, to a base station, PTRSs using resources associated with the uplink channel repetitions based at least in part on the determination of the one or more of the resource allocation or the channel usage.

In some aspects, the one or more instructions further cause the UE to receive, from the base station, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the one or more instructions further cause the UE to: receive, from the base station, a set of thresholds for MCSs corresponding to the resource allocation.

In some aspects, the one or more instructions further cause the UE to receive, from the base station, a set of thresholds for MCSs corresponding to the channel usage.

In some aspects, the one or more instructions further cause the UE to receive, from the base station, a set of thresholds for respective bandwidths corresponding to the resource allocation.

In some aspects, the one or more instructions further cause the UE to receive, from the base station, a set of thresholds for respective bandwidths corresponding to the channel usage.

In some aspects, a non-transitory computer-readable medium storing a set of instructions for wireless communication includes one or more instructions that, when executed by one or more processors of a base station, cause the base station to: receive, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions; and transmit, to the UE, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the one or more instructions further cause the base station to transmit, to the UE, a set of thresholds for MCSs corresponding to the resource allocation.

In some aspects, the one or more instructions further cause the base station to transmit, to the UE, a set of thresholds for MCSs corresponding to the channel usage.

In some aspects, the one or more instructions further cause the base station to transmit, to the UE, a set of thresholds for respective bandwidths corresponding to the resource allocation.

In some aspects, the one or more instructions further cause the base station to transmit, to the UE, a set of thresholds for respective bandwidths corresponding to the channel usage.

In some aspects, an apparatus for wireless communication includes means for determining one or more of a resource allocation associated with uplink channel repetitions or a channel usage indicating whether a downlink reception or another uplink transmission is present in resources in time between the uplink channel repetitions; and means for transmitting, to a base station, PTRSs using resources associated with the uplink channel repetitions based at least in part on the determination of the one or more of the resource allocation or the channel usage.

In some aspects, the apparatus includes means for receiving, from the base station, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the apparatus includes means for receiving, from the base station, a set of thresholds for MCSs corresponding to the resource allocation.

In some aspects, the apparatus includes means for receiving, from the base station, a set of thresholds for MCSs corresponding to the channel usage.

In some aspects, the apparatus includes means for receiving, from the base station, a set of thresholds for respective bandwidths corresponding to the resource allocation.

In some aspects, the apparatus includes means for receiving, from the base station, a set of thresholds for respective bandwidths corresponding to the channel usage.

In some aspects, an apparatus for wireless communication includes means for receiving, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions; and means for transmitting, to the UE, DMRS bundles across one or more slots based at least in part on the PTRSs.

In some aspects, the PTRSs are associated with a time density and a frequency density.

In some aspects, the uplink channel repetitions are PUSCH repetitions.

In some aspects, the uplink channel repetitions are PUCCH repetitions.

In some aspects, the resource allocation associated with the uplink channel repetitions indicates that the uplink channel repetitions are contiguous in time.

In some aspects, the resource allocation associated with the uplink channel repetitions indicates that the uplink channel repetitions are non-contiguous in time.

In some aspects, the resource allocation associated with the uplink channel repetitions indicates a gap between the uplink channel repetitions.

In some aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In some aspects, the other uplink transmission is an SRS transmission.

In some aspects, the apparatus includes means for transmitting, to the UE, a set of thresholds for MCSs corresponding to the resource allocation.

In some aspects, the apparatus includes means for transmitting, to the UE, a set of thresholds for MCSs corresponding to the channel usage.

In some aspects, the apparatus includes means for transmitting, to the UE, a set of thresholds for respective bandwidths corresponding to the resource allocation.

In some aspects, the apparatus includes means for transmitting, to the UE, a set of thresholds for respective bandwidths corresponding to the channel usage.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
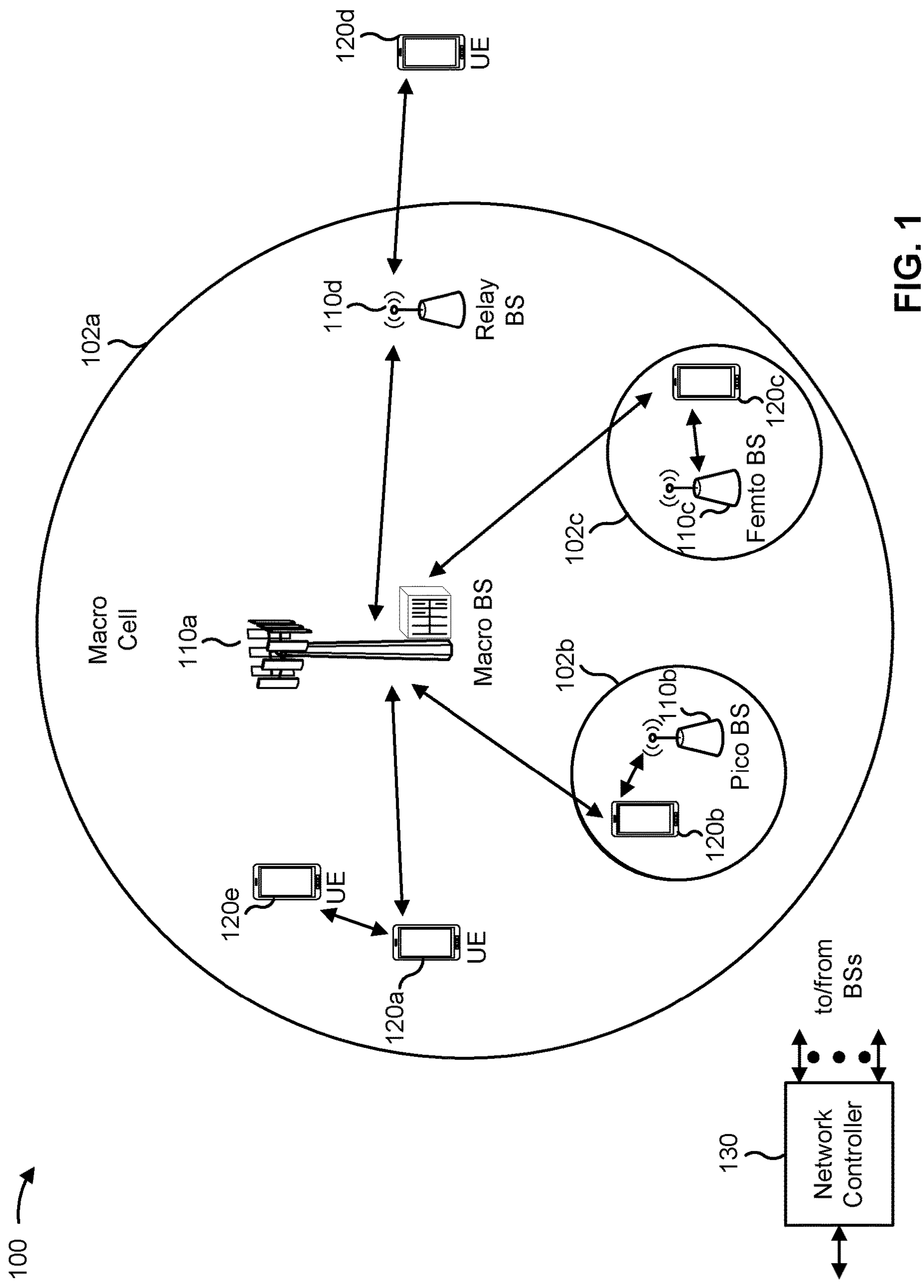
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
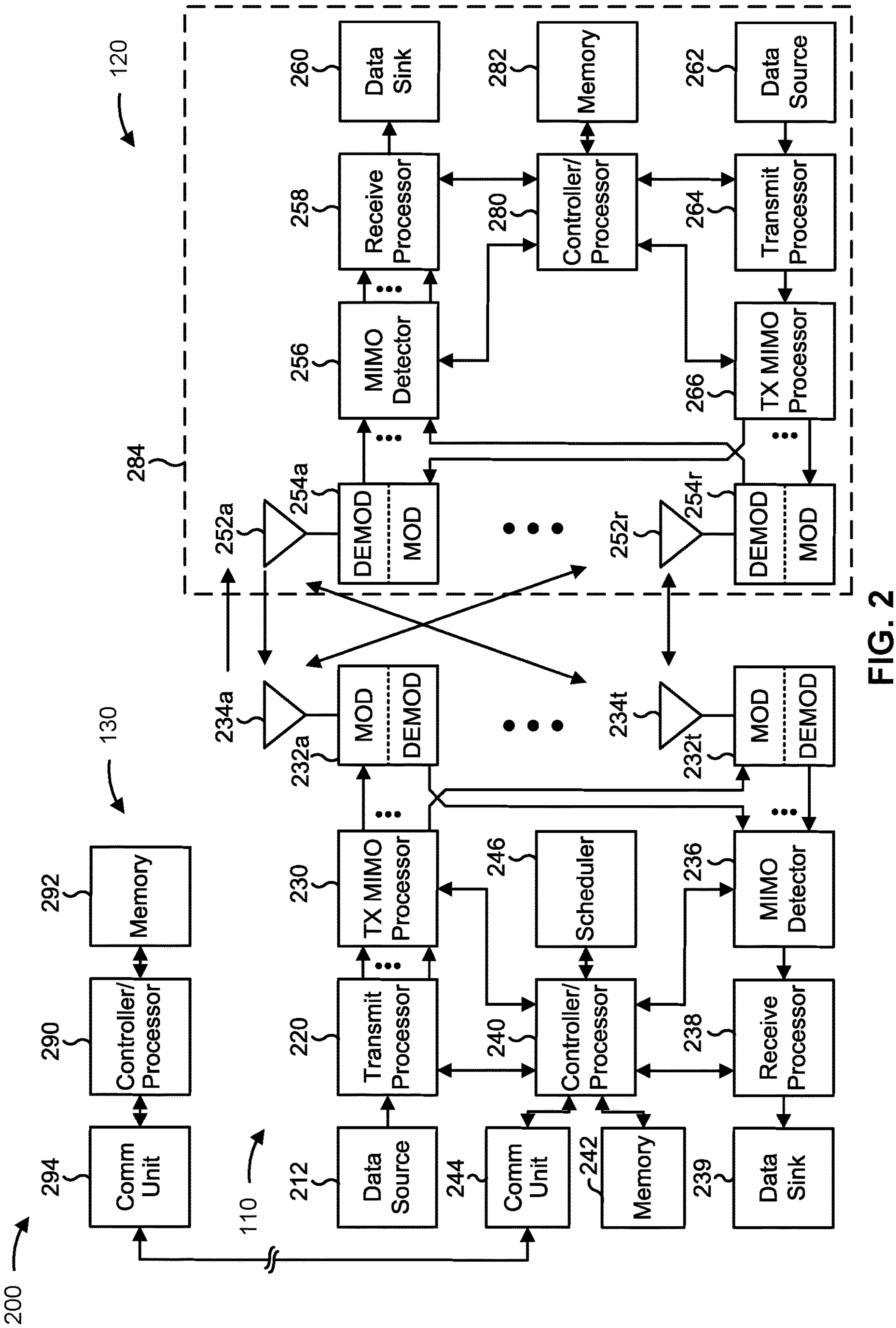
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with transmitting phase tracking reference signals (PTRSs) using resources associated with uplink channel repetitions, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for determining one or more of a resource allocation associated with uplink channel repetitions or a channel usage indicating whether a downlink reception or another uplink transmission is present in resources in time between the uplink channel repetitions; and/or means for transmitting, to a network node, PTRSs using resources associated with the uplink channel repetitions based at least in part on the determination of the one or more of the resource allocation or the channel usage. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a network node (e.g., base station 110) includes means for receiving, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions; and/or means for transmitting, to the UE, demodulation reference signal bundles across one or more slots based at least in part on the PTRSs. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

PTRSs may be used for phase noise tracking. PTRSs may be embedded in a physical downlink shared channel (PDSCH) or a PUSCH (CP-OFDM and DFT-S-OFDM) resource allocation. PTRSs may be active when a data channel is active for a given UE. For PTRSs, up to two ports may be configurable for a downlink and up to two ports may be configurable for an uplink. A presence of PTRSs and a density of the PTRSs may be based at least in part on an MCS and a resource block allocation size. Resource blocks containing PTRSs may be derived from scheduled resource blocks and an associated frequency density. PTRSs may not be mapped to resource blocks that are not scheduled for the UE. For a given resource block, if present, one PTRS port may be mapped on one subcarrier carrying one or more DMRS ports of an associated DMRS port group.

The UE may be configured with two sets of thresholds M={ptrsthMCS$_j$, j=1, 2, 3, 4} and R={ptrsthRB$_n$, n=0, 2, 4}, independently per bandwidth part, using dedicated radio resource control (RRC) signaling for uplink and downlink, respectively. A time density and a frequency density of PTRSs may be based at least in part on the two sets of thresholds. A first set of thresholds M may be MCS thresholds that are associated with the time density of the PTRSs, and a second set of thresholds R may be bandwidth allocation thresholds that are associated with the frequency density of the PTRSs.

At a given carrier frequency, for each subcarrier spacing applicable to a data channel at that carrier frequency, the UE may perform UE capability signaling of MCS and bandwidth thresholds. For example, the UE may report capability information indicating preferred MCS and bandwidth thresholds based at least in part on phase noise characteristics of the UE. The preferred MCS thresholds may be based at least in part on an MCS table with a maximum modulation order that the UE is capable of supporting, based at least in part on capability reporting from the UE to a network node (e.g., a base station).

When downlink PTRS or uplink PTRS is enabled, one PTRS report may be present in every OFDM symbol and every second resource block, unless downlink/uplink density tables are configured via RRC signaling.

For single user MIMO (SU-MIMO), predefined and/or RRC-configured associations may exist between PTRS densities and scheduled MCSs/bandwidths. Associations may exist between a scheduled MCS, or an MCS index (IMcs), and a PTRS time density. When the MCS index is less than a first threshold (ptrs-MCS1), PTRSs may not be present. When the MCS index is greater than or equal to the first threshold and less than a second threshold (ptrs-MCS2), a PTRS time density may be equal to four. When the MCS index is greater than or equal to the second threshold and less than a third threshold (ptrs-MCS3), a PTRS time density may be equal to two. When the MCS index is greater than or equal to the third threshold and less than a fourth threshold (ptrs-MCS4), a PTRS time density may be equal to one. Further, associations may exist between a contiguous scheduled bandwidth and a PTRS frequency density. The contiguous scheduled bandwidth may be represented by $N_{RB}$, which may indicate a quantity of resource blocks allocated to a user. When $N_{RB}$ is less than a first threshold ($N_{RB0}$), PTRSs may not be present. When $N_{RB}$ is greater than or equal to the first threshold and less than a second threshold ($N_{RB1}$), a PTRS frequency density may be equal to two. When $N_{RB}$ is greater than or equal to the second threshold, a PTRS frequency density may be equal to four.

For CP-OFDM, the PTRS time densities may be every fourth symbol, every second symbol, or every symbol. For CP-OFDM, the PTRS frequency densities may include occupying one subcarrier, occupying every second subcarrier, or occupying every fourth subcarrier. When occupying the one subcarrier, all resource elements may not be occupied, depending on a time density. The PTRS time density may increase when the scheduled MCS is increased, except for those reserved MCSs. The PTRS frequency density may decrease when the contiguous scheduled bandwidth is increased (e.g., a quantity of scheduled resource blocks).

A PTRS applicable to a CP-OFDM waveform may not have dedicated scrambling, but rather may be a repetition of a DMRS within a data channel. The PTRS may be a repetition of a subset of DMRS resource elements of a DMRS port. Further, in an OFDM symbol containing a DMRS, a PTRS may not be inserted but rather a DMRS observation may be used for phase noise estimation.

Figure 3:
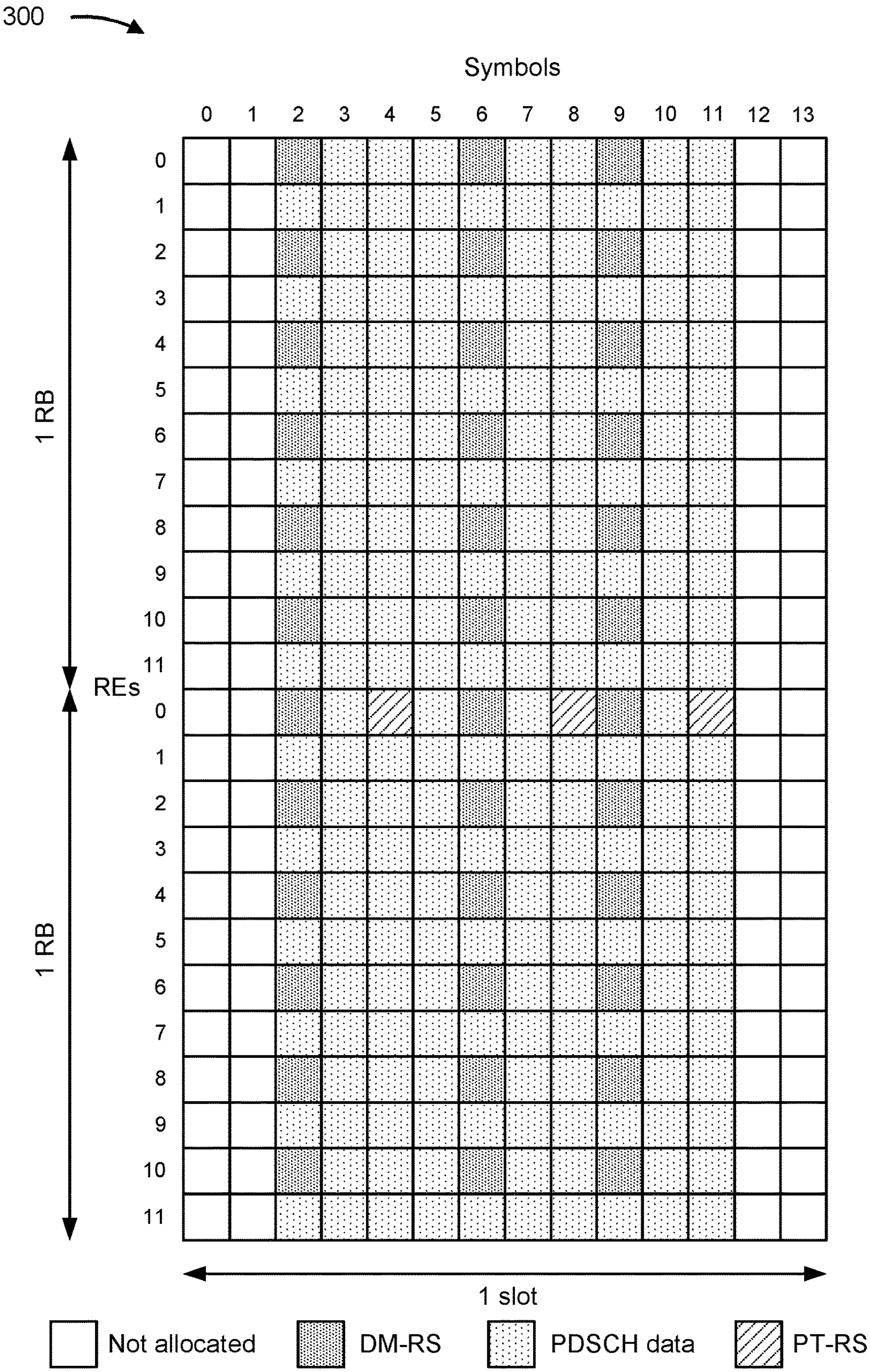
FIG. 3 is a diagram illustrating an example of single-symbol demodulation reference signals (DMRSs), in accordance with the present disclosure.

FIG. 3 is a diagram illustrating an example 300 of single-symbol DMRSs, in accordance with the present disclosure.

As shown in FIG. 3, a single-symbol DMRS pattern may be used in a slot that contains PDSCH data. DMRSs may span one symbol in a time domain and one resource element in the frequency domain. A PTRS may be present every other symbol in the time domain starting from a one-symbol DMRS.

As indicated above, FIG. 3 is provided as an example. Other examples may differ from what is described with regard to FIG. 3.

Figure 4:
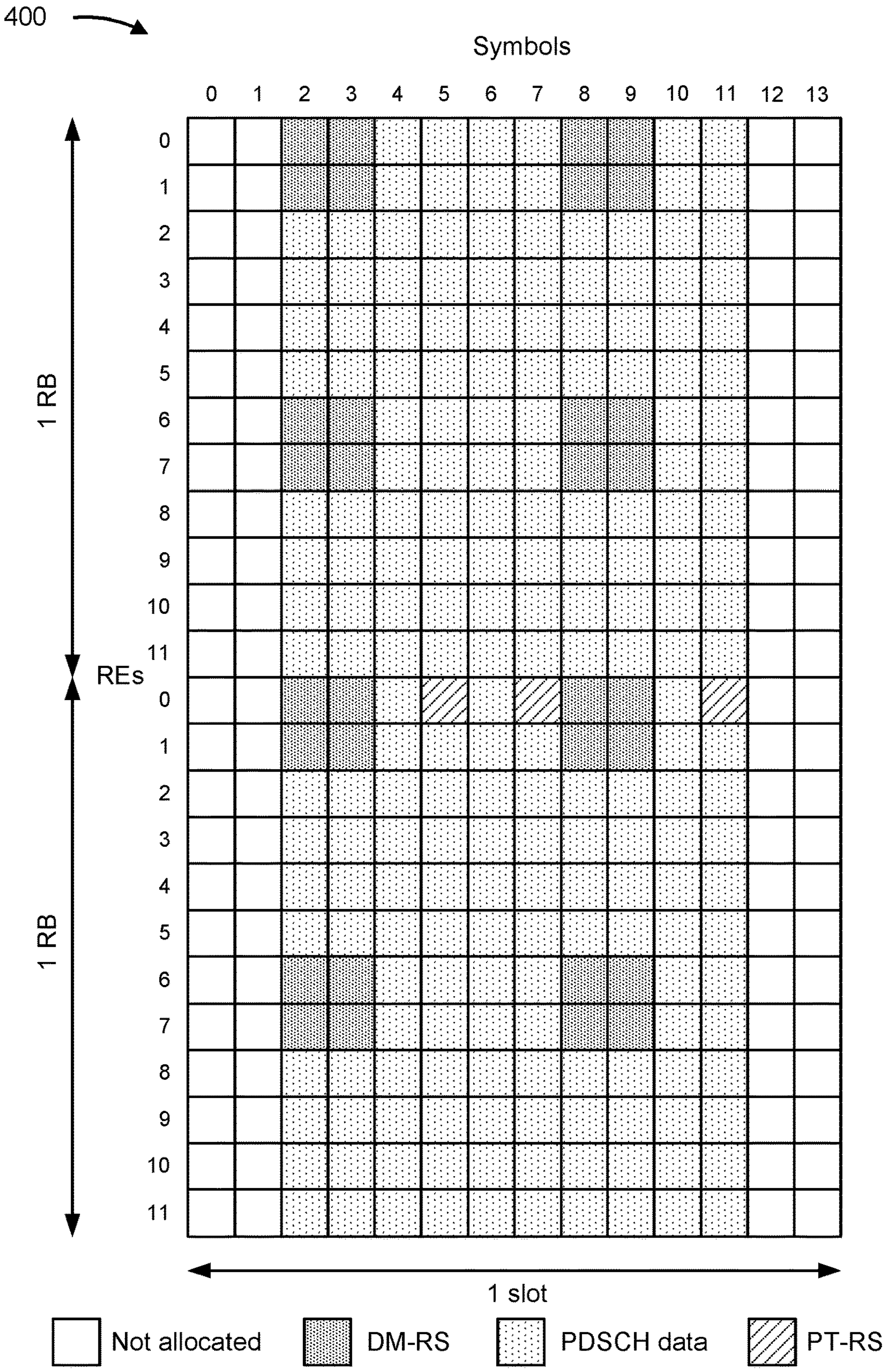
FIG. 4 is a diagram illustrating an example of double-symbol DMRSs, in accordance with the present disclosure.

FIG. 4 is a diagram illustrating an example 400 of double-symbol DMRSs, in accordance with the present disclosure.

As shown in FIG. 4, a double-symbol DMRS pattern may be used in a slot that contains PDSCH data. DMRSs may span two symbols in a time domain and two resource elements in a frequency domain. A PTRS may be present every other symbol in the time domain starting from an end of a double-symbol DMRS.

As indicated above, FIG. 4 is provided as an example. Other examples may differ from what is described with regard to FIG. 4

Channel estimation may be based at least in part on DMRS symbols within a slot. For cell edge UEs, performance of the channel estimation may be degraded due to channel estimation errors. DMRS bundling may enhance an accuracy of the channel estimation. With DMRS bundling, a UE may perform joint channel estimation, which may improve the performance of the channel estimation. Further, DMRS bundling may enhance an uplink channel coverage, such as a PUSCH or PUCCH coverage.

A UE may support DMRS bundling for an uplink channel (e.g., a PUSCH or PUCCH) based at least in part on a UE capability. The DMRS bundling may be associated with phase continuity maintenance requirements, so whether the UE is able to support DMRS bundling may be based at least in part on the UE capability to maintain phase continuity. An ability for the UE to maintain phase continuity may depend on whether an uplink channel transmission (e.g., a PUSCH transmission or a PUCCH transmission) is contiguous with another uplink channel transmission, or whether a gap exists between uplink channel transmissions. The gap may have a defined length and may be associated with a type of transmission (e.g., a downlink channel transmission). The uplink channel transmissions may include uplink channel repetitions, or may include a first uplink channel transmission and an uplink channel repetition. The phase continuity may be affected by the uplink channel transmissions, thereby impacting DMRS bundling and the UE's ability to maintain phase continuity.

In various aspects of techniques and apparatuses described herein, a UE may determine a resource allocation associated with uplink channel repetitions and/or a channel usage between the uplink channel repetitions. The uplink channel repetitions may be PUSCH repetitions or PUCCH repetitions. The UE may transmit, to a network node, PTRSs using resources associated with the uplink channel repetitions based at least in part on the resource allocation associated with the uplink channel repetitions and/or the channel usage between the uplink channel repetitions. In some aspects, the UE may transmit the PTRSs using the resources associated with the uplink channel repetitions based at least in part on whether the resource allocation indicates that the uplink channel repetitions are contiguous in time or non-contiguous in time. In some aspects, the UE may transmit the PTRSs using the resources associated with the uplink channel repetitions based at least in part on whether the resource allocation indicates a gap between the uplink channel repetitions or another uplink transmission is present in resources in time between the uplink channel repetitions. In some aspects, the UE may transmit the PTRSs using the resources associated with the uplink channel repetitions based at least in part on the channel usage indicating whether a downlink reception or another uplink transmission is present in resources in time between the uplink channel repetitions.

In various aspects of techniques and apparatuses described herein, the network node may transmit, to the UE, DMRS bundles across one or more slots based at least in part on the PTRSs. The DMRS bundles may include a plurality of DMRSs. The network node may use the PTRSs received from the UE to enable and/or improve the DMRS bundling across the slots. For example, the network node may estimate possible phase shifts across slots based at least in part on the PTRSs received from the UE. The network node may transmit DMRS bundles using information about the estimated phase shifts that increases a likelihood of the UE maintaining phase continuity, thereby allowing the UE to decode the DMRS bundles and perform joint channel estimation based at least in part on the DMRS bundles.

Figure 5:
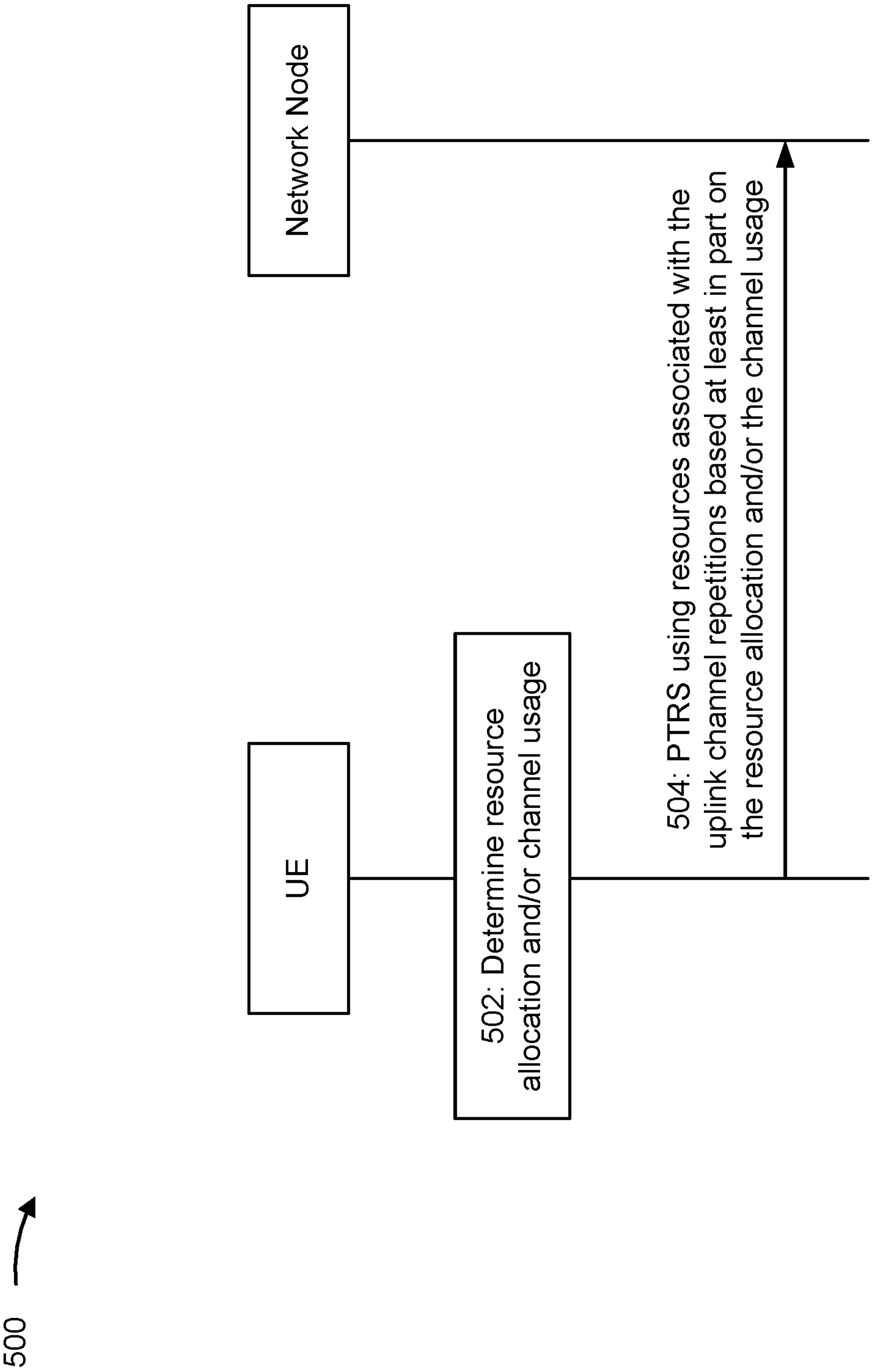
FIG. 5 is a diagram illustrating an example associated with transmitting phase tracking reference signals (PTRSs) using resources associated with uplink channel repetitions, in accordance with the present disclosure.

FIG. 5 is a diagram illustrating an example 500 associated with transmitting PTRSs using resources associated with uplink channel repetitions, in accordance with the present disclosure. As shown in FIG. 5, example 500 includes communication between a UE (e.g., UE 120) and a network node (e.g., base station 110). In some aspects, the UE and the network node may be included in a wireless network such as wireless network 100.

In some aspects, the term "network node" may refer to an aggregated base station, a disaggregated base station, and/or one or more components of a disaggregated base station. For example, in some aspects, "network node" may refer to a control unit, a distributed unit, a plurality of control units, a plurality of distributed units, and/or a combination thereof. In some aspects, "network node" may refer to one device configured to perform one or more functions such as those described above in connection with the base station 110. In some aspects, "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "network node" may refer to any one or more of those different devices. In some aspects, "network node" may refer to one or more virtual base stations, one or more virtual base station functions, and/or a combination of thereof. For example, in some cases, two or more base station functions may be instantiated on a single device. In some aspects, "network node" may refer to one of the base station functions and not another. In this way, a single device may include more than one base station.

As shown by reference number 502, the UE may determine a resource allocation associated with uplink channel repetitions and/or a channel usage between the uplink channel repetitions. The uplink channel repetitions may be PUSCH repetitions or PUCCH repetitions. In other words, the UE may determine the resource allocation of PUSCH and/or PUCCH repetitions, and/or the channel usage between the PUSCH and/or PUCCH repetitions.

In some aspects, the resource allocation associated with the uplink channel repetitions may indicate that the uplink channel repetitions are contiguous in time. In some aspects, the resource allocation associated with the uplink channel repetitions may indicate that the uplink channel repetitions are non-contiguous in time (e.g., a gap may be present between the uplink channel repetitions). For example, a first uplink channel repetition may be contiguous in time with a second uplink channel repetition. Alternatively, the first uplink channel repetition may be non-contiguous in time with the second uplink channel repetition.

In some aspects, the resource allocation associated with the uplink channel repetitions may indicate a size of a transmission window associated with the uplink channel repetitions. The transmission window may span from a first uplink transmission or a first uplink repetition in the uplink channel repetitions to a last uplink repetition in the uplink channel repetitions.

In some aspects, the UE may determine whether to transmit PTRSs using resources associated with the uplink channel repetitions, and if so, the time density and the frequency density of the PTRSs, based at least in part on the resource allocation associated with the uplink channel repetitions. For example, the UE may determine whether to transmit the PTRSs using the resources associated with the uplink channel repetitions based at least in part on whether the uplink channel repetitions are contiguous or back-to-back uplink channel repetitions, or whether a gap is present between the uplink channel repetitions (e.g., non-contiguous uplink channel repetitions). The UE may determine whether to transmit the PTRSs using the resources associated with the uplink channel repetitions based at least in part on a maximum size of the gap between the uplink channel repetitions. As another example, the UE may determine whether to transmit the PTRSs using the resources associated with the uplink channel repetitions based at least in part on a size of a transmission window. The transmission window may span from a first uplink channel transmission and/or a first uplink channel repetition to a last uplink channel repetition.

In some aspects, the channel usage between the uplink channel repetitions may indicate whether another uplink transmission is present in resources in time between the uplink channel repetitions. The other uplink transmission may be a sounding reference signal (SRS) transmission. In some aspects, the channel usage between the uplink channel repetitions may indicate whether a downlink reception occurs between the uplink channel repetitions. In other words, the channel usage may indicate whether a downlink reception or another uplink transmission is present in resources in time between the uplink channel repetitions. The channel usage may indicate that a downlink reception or another uplink transmission is present in resources in time between a first uplink channel repetition and a second uplink channel repetition. The downlink reception or the other uplink transmission may occupy time resources between the first uplink channel repetition and the second uplink channel repetition.

In some aspects, the UE may determine whether to transmit PTRSs using resources associated with the uplink channel repetitions, and if so, the time density and the frequency density of the PTRSs, based at least in part on the channel usage between the uplink channel repetitions. For example, the UE may determine whether to transmit the PTRSs using the resources associated with the uplink channel repetitions based at least in part on whether another uplink transmission (e.g., an SRS transmission) is present in resources in time between the uplink channel repetitions. As another example, the UE may determine whether to transmit the PTRSs using the resources associated with the uplink channel repetitions based at least in part on whether a downlink reception is performed between the uplink channel repetitions. The other uplink transmission or the downlink reception may occupy time resources between the uplink channel repetitions (e.g., between a first uplink channel repetition and a second uplink channel repetition).

As shown by reference number 504, the UE may transmit, to the network node, PTRSs using resources associated with the uplink channel repetitions based at least in part on the determination of the resource allocation associated with the uplink channel repetitions and/or the channel usage between the uplink channel repetitions. The PTRSs may be associated with a time density and a frequency density. The network node may transmit, to the UE, DMRS bundles across one or more slots based at least in part on the PTRSs. In other words, the PTRSs may enable and/or improve DMRS bundling across slots, since the PTRSs may allow the network node to estimate possible phase shifts across the slots. The network node may transmit the DMRS bundles considering the possible phase shifts across the slots, which may increase a likelihood of the UE maintaining a phase continuity and successfully decoding the DMRS bundles to perform joint channel estimation.

In some aspects, the UE may receive, from the network node, a set of thresholds for MCSs corresponding to the resource allocation. In some aspects, the UE may receive, from the network node, a set of thresholds for MCSs corresponding to the channel usage. In some aspects, the UE may receive, from the network node, a set of thresholds for respective bandwidths corresponding to the resource allocation. In some aspects, the UE may receive, from the network node, a set of thresholds for respective bandwidths corresponding to the channel usage.

In other words, the network node may configure separate sets of thresholds for MCSs and/or bandwidths. The bandwidths may correspond to different frequency allocations. The separate sets of thresholds may be for different types of resource allocations (e.g., resource allocations associated with contiguous uplink channel repetitions, non-contiguous uplink channel repetitions, uplink channel repetitions having a gap that satisfies a first threshold, uplink channel repetitions having a gap that satisfies a second threshold, uplink channel repetitions associated with a size of a transmission window that satisfies a first threshold, and/or uplink channel repetitions having a gap that satisfies a second threshold, uplink channel repetitions associated with a size of a transmission window that satisfies a second threshold) for uplink channel repetitions and/or different types of channel usages (e.g., channel usages associated with other uplink transmissions, or downlink receptions) between uplink channel repetitions.

In some aspects, the UE may determine a scheduled MCS and/or a scheduled bandwidth, and may compare the scheduled MCS and/or the scheduled bandwidth to the sets of thresholds for MCSs and bandwidths tailored to the different types of resource allocations and the different types of channel usages. The UE may compare the scheduled MCS and/or the scheduled bandwidth to specific sets of thresholds, depending on the resource allocation and the channel usage. The UE may determine to transmit PTRSs, with a selected time density and a selected frequency density, based at least in part on the comparison of the scheduled MCS and/or the scheduled bandwidth to the sets of thresholds. The UE may determine the time density of the PTRSs based at least in part on the scheduled MCS in relation to the sets of thresholds, and the UE may determine the frequency density of the PTRSs based at least in part on the scheduled bandwidth in relation to the sets of thresholds.

As indicated above, FIG. 5 is provided as an example. Other examples may differ from what is described with regard to FIG. 5.

Figure 6:
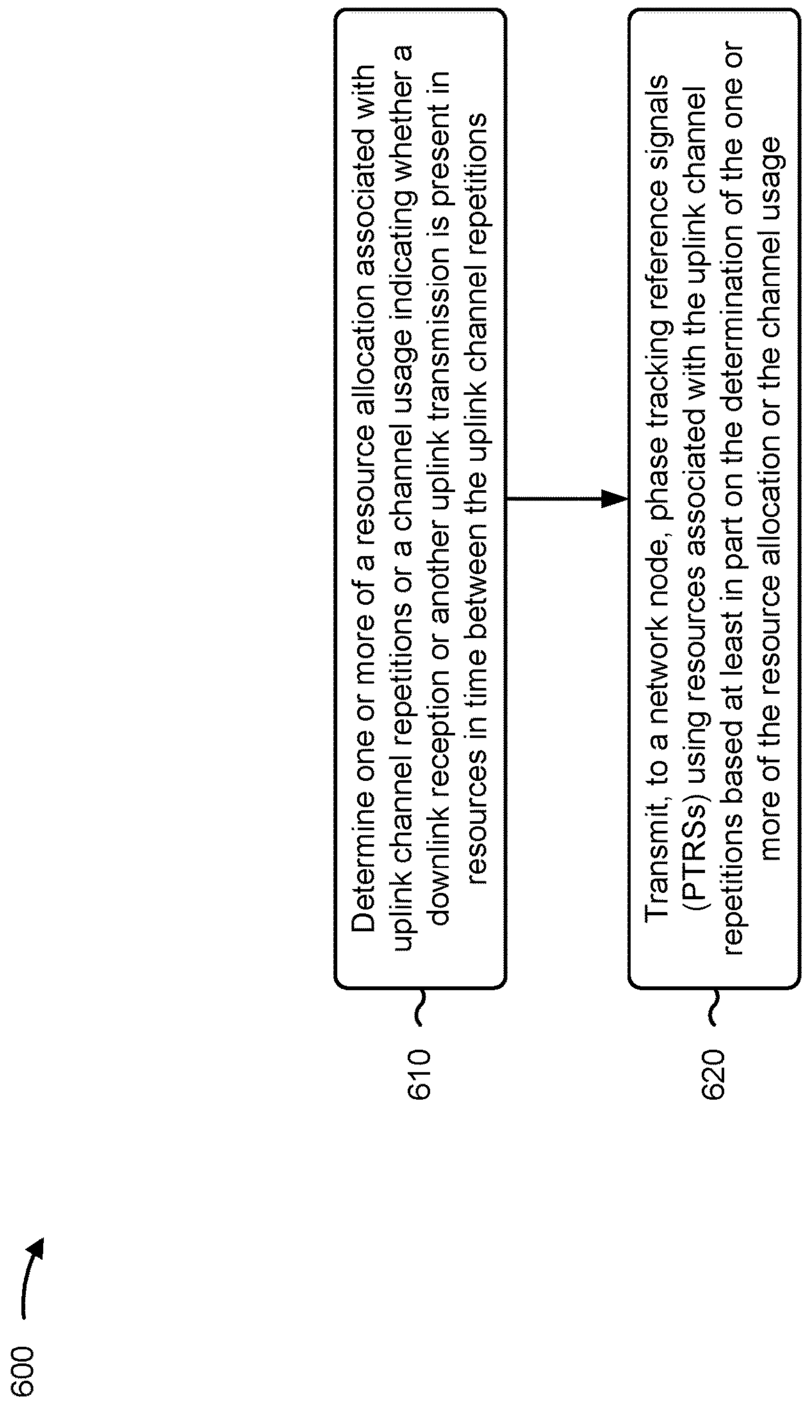
FIGS. 6-7 are diagrams illustrating example processes associated with transmitting PTRSs using resources associated with uplink channel repetitions, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for transmitting PTRSs using resources associated with uplink channel repetitions.

As shown in FIG. 6, in some aspects, process 600 may include determining one or more of a resource allocation associated with uplink channel repetitions or a channel usage indicating whether a downlink reception or another uplink transmission is present in resources in time between the uplink channel repetitions (block 610). For example, the UE (e.g., using determination component 808, depicted in FIG. 8) may determine one or more of a resource allocation associated with uplink channel repetitions or a channel usage indicating whether a downlink reception or another uplink transmission is present in resources in time between the uplink channel repetitions, as described above.

As further shown in FIG. 6, in some aspects, process 600 may include transmitting, to a network node, PTRSs using resources associated with the uplink channel repetitions based at least in part on the determination of the one or more of the resource allocation or the channel usage (block 620). For example, the UE (e.g., using transmission component 804, depicted in FIG. 8) may transmit, to a network node, PTRSs using resources associated with the uplink channel repetitions based at least in part on the determination of the one or more of the resource allocation or the channel usage, as described above.

Process 600 may include additional aspects, such as any single aspect or any combination of aspects described below and/or in connection with one or more other processes described elsewhere herein.

In a first aspect, process 600 includes receiving, from the network node, DMRS bundles across one or more slots based at least in part on the PTRSs.

In a second aspect, alone or in combination with the first aspect, the PTRSs are associated with a time density and a frequency density.

In a third aspect, alone or in combination with one or more of the first and second aspects, the uplink channel repetitions are PUSCH repetitions.

In a fourth aspect, alone or in combination with one or more of the first through third aspects, the uplink channel repetitions are PUCCH repetitions.

In a fifth aspect, alone or in combination with one or more of the first through fourth aspects, the resource allocation associated with the uplink channel repetitions indicates that the uplink channel repetitions are contiguous in time.

In a sixth aspect, alone or in combination with one or more of the first through fifth aspects, the resource allocation associated with the uplink channel repetitions indicates that the uplink channel repetitions are non-contiguous in time.

In a seventh aspect, alone or in combination with one or more of the first through sixth aspects, the resource allocation associated with the uplink channel repetitions indicates a gap between the uplink channel repetitions.

In an eighth aspect, alone or in combination with one or more of the first through seventh aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In a ninth aspect, alone or in combination with one or more of the first through eighth aspects, the other uplink transmission is an SRS transmission.

In a tenth aspect, alone or in combination with one or more of the first through ninth aspects, process 600 includes receiving, from the network node, a set of thresholds for MCSs corresponding to the resource allocation associated with the uplink channel repetitions.

In an eleventh aspect, alone or in combination with one or more of the first through tenth aspects, process 600 includes receiving, from the network node, a set of thresholds for MCSs corresponding to the channel usage.

In a twelfth aspect, alone or in combination with one or more of the first through eleventh aspects, process 600 includes receiving, from the network node, a set of thresholds for respective bandwidths corresponding to the resource allocation.

In a thirteenth aspect, alone or in combination with one or more of the first through twelfth aspects, process 600 includes receiving, from the network node, a set of thresholds for respective bandwidths corresponding to the channel usage.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
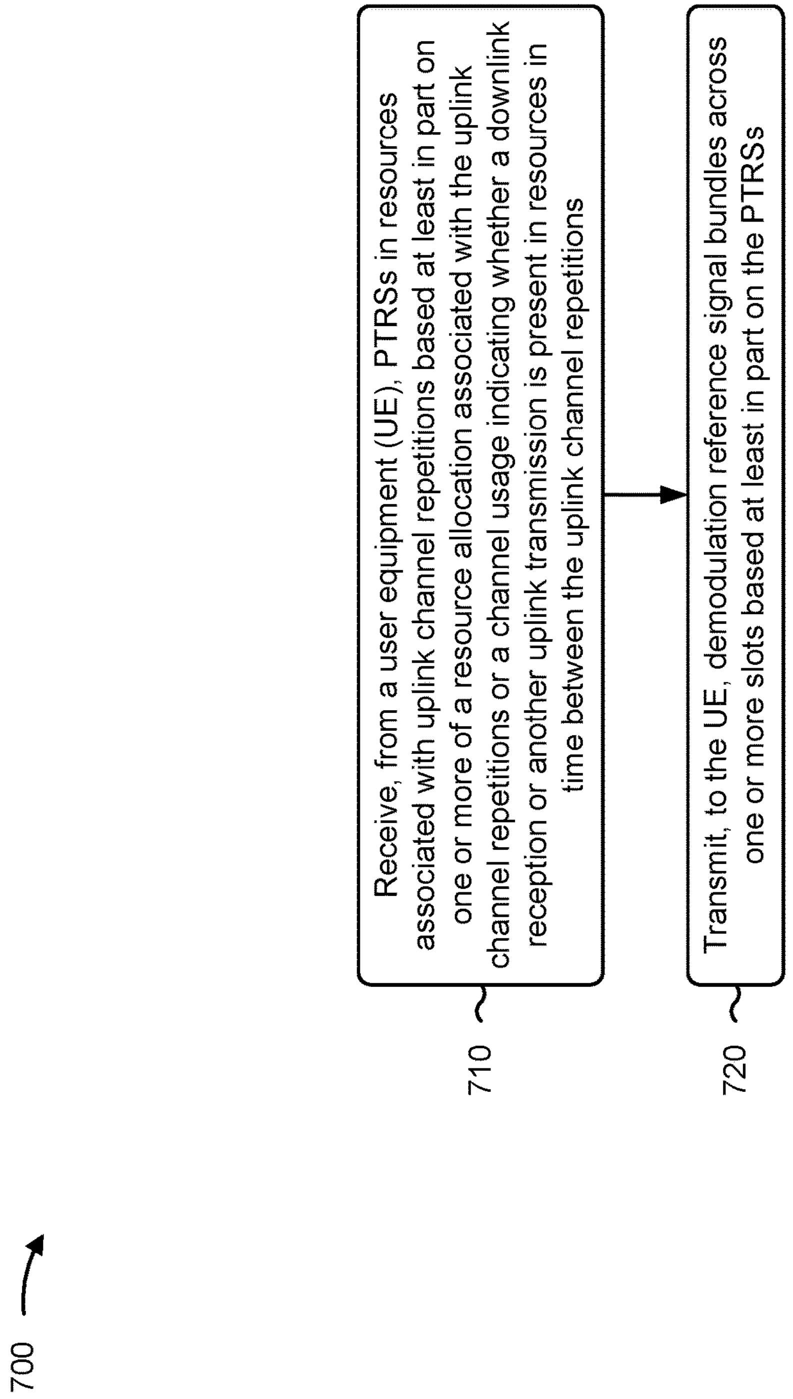

FIG. 7 is a diagram illustrating an example process 700 performed, for example, by a network node, in accordance with the present disclosure. Example process 700 is an example where the network node (e.g., base station 110) performs operations associated with techniques for transmitting PTRSs using resources associated with uplink channel repetitions.

As shown in FIG. 7, in some aspects, process 700 may include receiving, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions (block 710). For example, the network node (e.g., using reception component 902, depicted in FIG. 9) may receive, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions, as described above.

As further shown in FIG. 7, in some aspects, process 700 may include transmitting, to the UE, DMRS bundles across one or more slots based at least in part on the PTRSs (block 720). For example, the network node (e.g., using transmission component 904, depicted in FIG. 9) may transmit, to the UE, DMRS bundles across one or more slots based at least in part on the PTRSs, as described above.

Process 700 may include additional aspects, such as any single aspect or any combination of aspects described below and/or in connection with one or more other processes described elsewhere herein.

In a first aspect, the PTRSs are associated with a time density and a frequency density.

In a second aspect, alone or in combination with the first aspect, the uplink channel repetitions are PUSCH repetitions.

In a third aspect, alone or in combination with one or more of the first and second aspects, the uplink channel repetitions are PUCCH repetitions.

In a fourth aspect, alone or in combination with one or more of the first through third aspects, the resource allocation associated with the uplink channel repetitions indicates that the uplink channel repetitions are contiguous in time.

In a fifth aspect, alone or in combination with one or more of the first through fourth aspects, the resource allocation associated with the uplink channel repetitions indicates that the uplink channel repetitions are non-contiguous in time.

In a sixth aspect, alone or in combination with one or more of the first through fifth aspects, the resource allocation associated with the uplink channel repetitions indicates a gap between the uplink channel repetitions.

In a seventh aspect, alone or in combination with one or more of the first through sixth aspects, the resource allocation associated with the uplink channel repetitions indicates a size of a transmission window associated with the uplink channel repetitions, and the transmission window spans from a first uplink transmission or a first uplink repetition in the uplink channel repetitions to a last uplink repetition in the uplink channel repetitions.

In an eighth aspect, alone or in combination with one or more of the first through seventh aspects, the other uplink transmission is an SRS transmission.

In a nineth aspect, alone or in combination with one or more of the first through eighth aspects, process 700 includes transmitting, to the UE, a set of thresholds for MCSs corresponding to the resource allocation.

In a tenth aspect, alone or in combination with one or more of the first through nineth aspects, process 700 includes transmitting, to the UE, a set of thresholds for MCSs corresponding to the channel usage.

In an eleventh aspect, alone or in combination with one or more of the first through tenth aspects, process 700 includes transmitting, to the UE, a set of thresholds for respective bandwidths corresponding to the resource allocation.

In a twelfth aspect, alone or in combination with one or more of the first through eleventh aspects, process 700 includes transmitting, to the UE, a set of thresholds for respective bandwidths corresponding to the channel usage.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
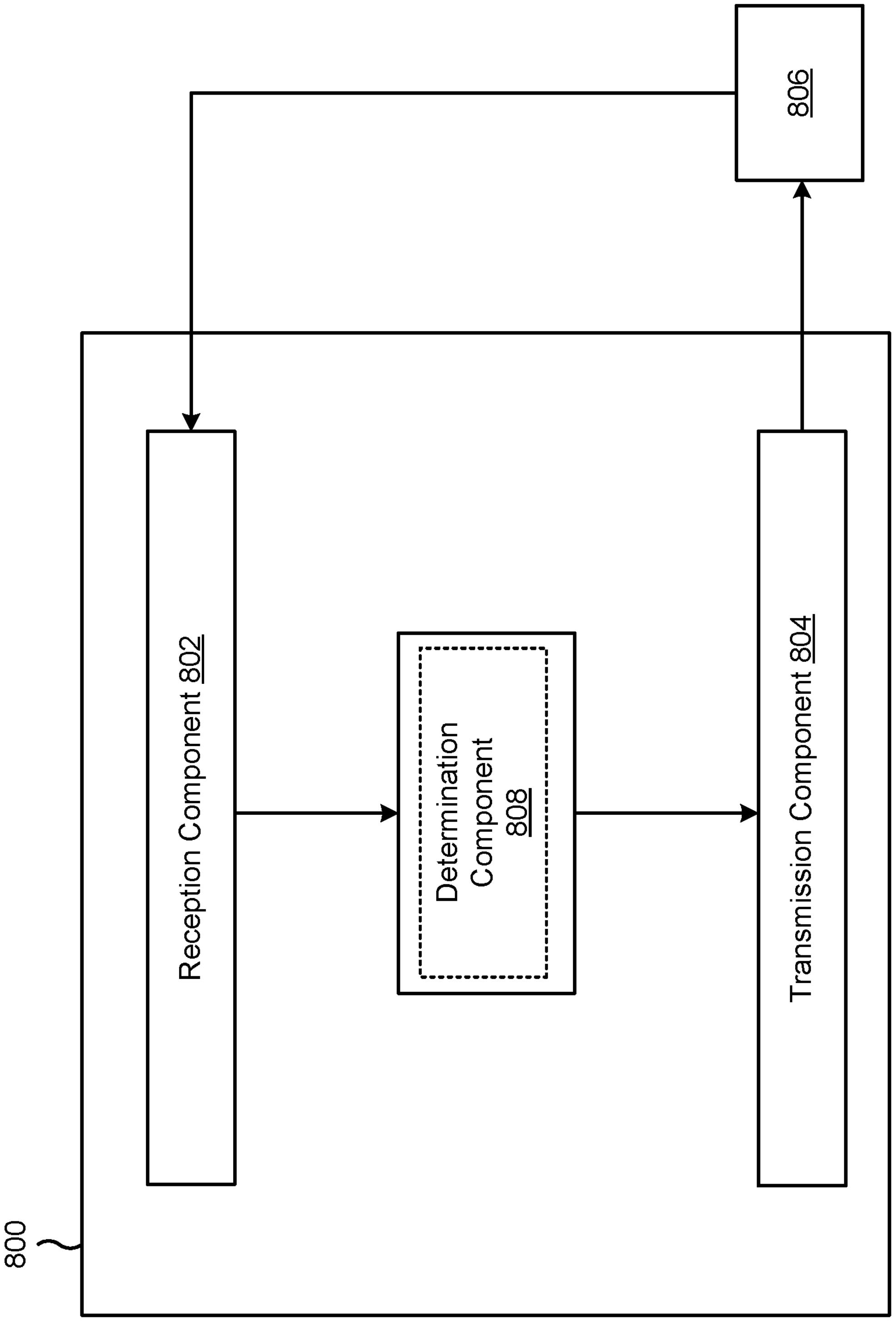
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may determine one or more of a resource allocation associated with uplink channel repetitions or a channel usage indicating whether a downlink reception or another uplink transmission is present in resources in time between the uplink channel repetitions. The transmission component 804 may transmit, to a network node, PTRSs using resources associated with the uplink channel repetitions based at least in part on the determination of the one or more of the resource allocation or the channel usage.

The reception component 802 may receive, from the network node, DMRS bundles across one or more slots based at least in part on the PTRSs. The reception component 802 may receive, from the network node, a set of thresholds for MCSs corresponding to the resource allocation. The reception component 802 may receive, from the network node, a set of thresholds for MCSs corresponding to the channel usage. The reception component 802 may receive, from the network node, a set of thresholds for respective bandwidths corresponding to the resource allocation. The reception component 802 may receive, from the network node, a set of thresholds for respective bandwidths corresponding to the channel usage.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
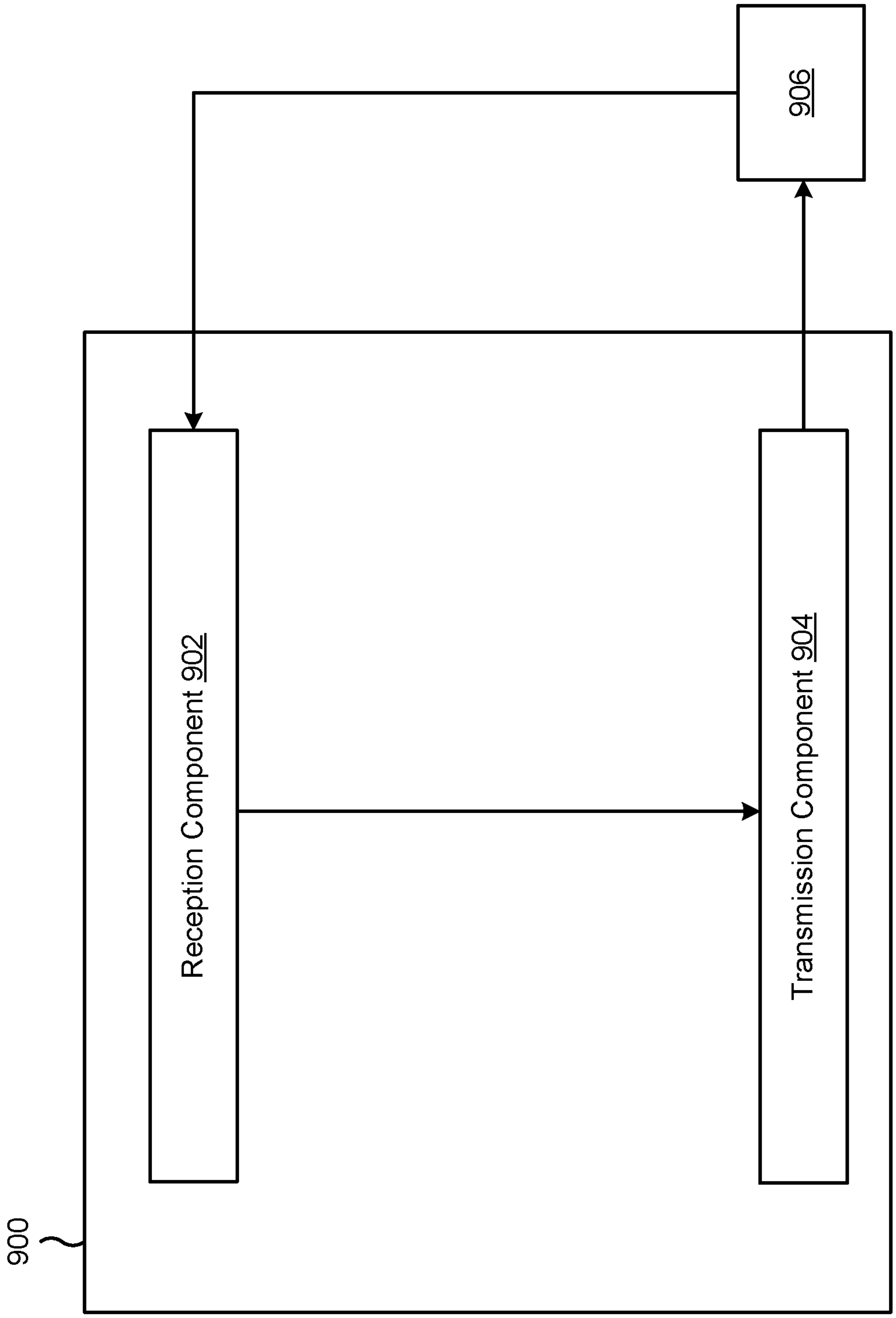

FIG. 9 is a block diagram of an example apparatus 900 for wireless communication. The apparatus 900 may be a network node (e.g., a base station), or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, PTRSs in resources associated with uplink channel repetitions based at least in part on one or more of a resource allocation associated with the uplink channel repetitions or a channel usage indicating whether a downlink reception or another uplink transmission is present in resources in time between the uplink channel repetitions. The transmission component 904 may transmit, to the UE, DMRS bundles across one or more slots based at least in part on the PTRSs.

The transmission component 904 may transmit, to the UE, a set of thresholds for MCSs corresponding to the resource allocation. The transmission component 904 may transmit, to the UE, a set of thresholds for MCSs corresponding to the channel usage. The transmission component 904 may transmit, to the UE, a set of thresholds for respective bandwidths corresponding to the resource allocation. The transmission component 904 may transmit, to the UE, a set of thresholds for respective bandwidths corresponding to the channel usage.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: determining one or more of a resource allocation associated with uplink channel repetitions or a channel usage indicating whether a downlink reception or another uplink transmission is present in resources in time between the uplink channel repetitions; and transmitting, to a network node, phase tracking reference signals (PTRSs) using resources associated with the uplink channel repetitions based at least in part on the determination of the one or more of the resource allocation or the channel usage.

Aspect 2: The method of Aspect 1, further comprising: receiving, from the network node, demodulation reference signal bundles across one or more slots based at least in part on the PTRSs.

Aspect 3: The method of any of Aspects 1 through 2, wherein the PTRSs are associated with a time density and a frequency density.

Aspect 4: The method of any of Aspects 1 through 3, wherein the uplink channel repetitions are physical uplink shared channel repetitions.

Aspect 5: The method of any of Aspects 1 through 4, wherein the uplink channel repetitions are physical uplink control channel repetitions.

Aspect 6: The method of any of Aspects 1 through 5, wherein the resource allocation associated with the uplink channel repetitions indicates that the uplink channel repetitions are contiguous in time.

Aspect 7: The method of any of Aspects 1 through 6, wherein the resource allocation associated with the uplink channel repetitions indicates that the uplink channel repetitions are non-contiguous in time.

Aspect 8: The method of any of Aspects 1 through 7, wherein the resource allocation associated with the uplink channel repetitions indicates a gap between the uplink channel repetitions.

Aspect 9: The method of any of Aspects 1 through 8, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

Aspect 10: The method of any of Aspects 1 through 9, wherein the other uplink transmission is a sounding reference signal transmission.

Aspect 11: The method of any of Aspects 1 through 10, further comprising: receiving, from the network node, a set of thresholds for modulation and coding schemes corresponding to the resource allocation.

Aspect 12: The method of any of Aspects 1 through 11, further comprising: receiving, from the network node, a set of thresholds for modulation and coding schemes corresponding to the channel usage.

Aspect 13: The method of any of Aspects 1 through 12, further comprising: receiving, from the network node, a set of thresholds for respective bandwidths corresponding to the resource allocation.

Aspect 14: The method of any of Aspects 1 through 13, further comprising: receiving, from the network node, a set of thresholds for respective bandwidths corresponding to the channel usage.

Aspect 15: A method of wireless communication performed by a network node, comprising: receiving, from a user equipment (UE), phase tracking reference signals (PTRSs) in resources associated with uplink channel repetitions based at least in part on one or more of a resource allocation associated with the uplink channel repetitions or a channel usage indicating whether a downlink reception or another uplink transmission is present in resources in time between the uplink channel repetitions; and transmitting, to the UE, demodulation reference signal bundles across one or more slots based at least in part on the PTRSs.

Aspect 16: The method of Aspect 15, wherein the PTRSs are associated with a time density and a frequency density.

Aspect 17: The method of any of Aspects 15 through 16, wherein the uplink channel repetitions are physical uplink shared channel repetitions.

Aspect 18: The method of any of Aspects 15 through 17, wherein the uplink channel repetitions are physical uplink control channel repetitions.

Aspect 19: The method of any of Aspects 15 through 18, wherein the resource allocation associated with the uplink channel repetitions indicates that the uplink channel repetitions are contiguous in time.

Aspect 20: The method of any of Aspects 15 through 19, wherein the resource allocation associated with the uplink channel repetitions indicates that the uplink channel repetitions are non-contiguous in time.

Aspect 21: The method of any of Aspects 15 through 20, wherein the resource allocation associated with the uplink channel repetitions indicates a gap between the uplink channel repetitions.

Aspect 22: The method of any of Aspects 15 through 21, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

Aspect 23: The method of any of Aspects 15 through 22, wherein the other uplink transmission is a sounding reference signal transmission.

Aspect 24: The method of any of Aspects 15 through 23, further comprising: transmitting, to the UE, a set of thresholds for modulation and coding schemes corresponding to the resource allocation.

Aspect 25: The method of any of Aspects 15 through 24, further comprising: transmitting, to the UE, a set of thresholds for modulation and coding schemes corresponding to the channel usage.

Aspect 26: The method of any of Aspects 15 through 25, further comprising: transmitting, to the UE, a set of thresholds for respective bandwidths corresponding to the resource allocation.

Aspect 27: The method of any of Aspects 15 through 26, further comprising: transmitting, to the UE, a set of thresholds for respective bandwidths corresponding to the channel usage associated with the uplink channel repetitions.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: A device for wireless communication, comprising a memory and one or more processors coupled to the memory, the memory and the one or more processors configured to perform the method of one or more of Aspects 1-14.

Aspect 30: An apparatus for wireless communication, comprising at least one means for performing the method of one or more of Aspects 1-14.

Aspect 31: A non-transitory computer-readable medium storing code for wireless communication, the code comprising instructions executable by a processor to perform the method of one or more Aspects of 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 1-14.

Aspect 33: An apparatus for wireless communication at a device, comprising a processor; memory coupled with the processor; and instructions stored in the memory and executable by the processor to cause the apparatus to perform the method of one or more of Aspects 15-27.

Aspect 34: A device for wireless communication, comprising a memory and one or more processors coupled to the memory, the memory and the one or more processors configured to perform the method of one or more of Aspects 15-27.

Aspect 35: An apparatus for wireless communication, comprising at least one means for performing the method of one or more of Aspects 15-27.

Aspect 36: A non-transitory computer-readable medium storing code for wireless communication, the code comprising instructions executable by a processor to perform the method of one or more Aspects of 15-27.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description, but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining one or more of:

a resource allocation associated with uplink channel repetitions, or a channel usage indicating whether: a downlink reception is present in resources in time between the uplink channel repetitions, or another uplink transmission is present in resources in time between the uplink channel repetitions; and transmitting, to a network node, phase tracking reference signals (PTRSs) using resources within the uplink channel repetitions based at least in part on the determination of the one or more of the resource allocation or the channel usage, wherein the PTRSs are associated with a time density and a frequency density.

2. The method of claim 1, further comprising:

receiving, from the network node, demodulation reference signal bundles across one or more slots based at least in part on the PTRSs.

3. The method of claim 1, wherein:

the uplink channel repetitions are physical uplink shared channel repetitions; or the uplink channel repetitions are physical uplink control channel repetitions.

4. The method of claim 1, wherein:

the resource allocation associated with the uplink channel repetitions indicates that the uplink channel repetitions are contiguous in time;

the resource allocation associated with the uplink channel repetitions indicates that the uplink channel repetitions are non-contiguous in time; or the resource allocation associated with the uplink channel repetitions indicates a gap between the uplink channel repetitions.

5. The method of claim 1, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

6. The method of claim 1, wherein the other uplink transmission is a sounding reference signal transmission.

7. The method of claim 1, further comprising:

receiving, from the network node, a set of thresholds for one or more of: modulation and coding schemes corresponding to the resource allocation, modulation and coding schemes corresponding to the channel usage, respective bandwidths corresponding to the resource allocation, or respective bandwidths corresponding to the channel usage.

8. The method of claim 1, wherein the time density is associated with a first set of thresholds and the frequency density is associated with a second set of thresholds.

9. The method of claim 8, wherein the first set of thresholds comprise a set of modulation and coding scheme thresholds.

10. The method of claim 8, wherein the second set of thresholds comprise a ser of bandwidth allocation thresholds.

11. The method of claim 8, further comprising:

transmitting a capability report indicating a preference corresponding to the first set of thresholds and a preference corresponding to the second set of thresholds.

12. A method of wireless communication performed by a network node, comprising:

receiving, from a user equipment (UE), phase tracking reference signals (PTRSs) in resources within uplink channel repetitions based at least in part on one or more of:

a resource allocation associated with the uplink channel repetitions, or a channel usage indicating whether: a downlink reception is present in resources in time between the uplink channel repetitions, or another uplink transmission is present in the resources in time between the uplink channel repetitions; and transmitting, to the UE, demodulation reference signal bundles across one or more slots based at least in part on the PTRSs, wherein the PTRSs are associated with a time density and a frequency density.

13. The method of claim 12, wherein:

the uplink channel repetitions are physical uplink shared channel repetitions; or the uplink channel repetitions are physical uplink control channel repetitions.

14. The method of claim 12, wherein:

the resource allocation associated with the uplink channel repetitions indicates that the uplink channel repetitions are contiguous in time;

the resource allocation associated with the uplink channel repetitions indicates that the uplink channel repetitions are non-contiguous in time; or the resource allocation associated with the uplink channel repetitions indicates a gap between the uplink channel repetitions.

15. The method of claim 12, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

16. The method of claim 12, wherein the other uplink transmission is a sounding reference signal transmission.

17. The method of claim 9, further comprising:

transmitting, to the UE, a set of thresholds for one or more of: modulation and coding schemes corresponding to the resource allocation, modulation and coding schemes corresponding to the channel usage, respective bandwidths corresponding to the resource allocation, or respective bandwidths corresponding to the channel usage.

18. A user equipment (UE) for wireless communication, comprising:

one or more memories; and one or more processors, coupled to the one or more memories, configured to:

determine one or more of:

a resource allocation associated with uplink channel repetitions, or a channel usage indicating whether: a downlink reception is present in resources in time between the uplink channel repetitions, or another uplink transmission is present in the resources in time between the uplink channel repetitions; and transmit, to a network node, phase tracking reference signals (PTRSs) using resources within the uplink channel repetitions based at least in part on the determination of the one or more of the resource allocation or the channel usage, wherein the PTRSs are associated with a time density and a frequency density.

19. The UE of claim 18, wherein the one or more processors are further configured to:

receive, from the network node, demodulation reference signal bundles across one or more slots based at least in part on the PTRSs.

20. The UE of claim 18, wherein:

the uplink channel repetitions are physical uplink shared channel repetitions; or the uplink channel repetitions are physical uplink control channel repetitions.

21. The UE of claim 18, wherein:

the resource allocation associated with the uplink channel repetitions indicates that the uplink channel repetitions are contiguous in time;

the resource allocation associated with the uplink channel repetitions indicates that the uplink channel repetitions are non-contiguous in time; or the resource allocation associated with the uplink channel repetitions indicates a gap between the uplink channel repetitions.

22. The UE of claim 18, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

23. The UE of claim 18, wherein the other uplink transmission is a sounding reference signal transmission.

24. The UE of claim 18, wherein the one or more processors are further configured to:

receive, from the network node, a set of thresholds for one or more of: modulation and coding schemes corresponding to the resource allocation, modulation and coding schemes corresponding to the channel usage, respective bandwidths corresponding to the resource allocation, or respective bandwidths corresponding to the channel usage.

25. A network node for wireless communication, comprising:

one or more memories; and one or more processors, coupled to the one or more memories, configured to:

receive, from a user equipment (UE), phase tracking reference signals (PTRSs) in resources within uplink channel repetitions based at least in part on one or more of:

a resource allocation associated with the uplink channel repetitions, or a channel usage indicating whether: a downlink reception is present in resources in time between the uplink channel repetitions, or another uplink transmission is present in the resources in time between the uplink channel repetitions; and transmit, to the UE, demodulation reference signal bundles across one or more slots based at least in part on the PTRSs, wherein the PTRSs are associated with a time density and a frequency density.

26. The network node of claim 25, wherein:

the uplink channel repetitions are physical uplink shared channel repetitions; or the uplink channel repetitions are physical uplink control channel repetitions.

27. The network node of claim 25, wherein:

the resource allocation associated with the uplink channel repetitions indicates that the uplink channel repetitions are contiguous in time;

the resource allocation associated with the uplink channel repetitions indicates that the uplink channel repetitions are non-contiguous in time; or the resource allocation associated with the uplink channel repetitions indicates a gap between the uplink channel repetitions.

28. The network node of claim 25, wherein the resource allocation associated with the uplink channel repetitions indicates a size of a transmission window associated with the uplink channel repetitions, wherein the transmission window spans from a first uplink transmission or a first uplink repetition in the uplink channel repetitions to a last uplink repetition in the uplink channel repetitions.

29. The network node of claim 25, wherein the other uplink transmission is a sounding reference signal transmission.

30. The network node of claim 25, wherein the one or more processors are further configured to:

transmit, to the UE, a set of thresholds for one or more of: modulation and coding schemes corresponding to the resource allocation, modulation and coding schemes corresponding to the channel usage, respective bandwidths corresponding to the resource allocation, or respective bandwidths corresponding to the channel usage.

* * * * *